United States Patent
Hsu et al.

(10) Patent No.: US 7,813,050 B1
(45) Date of Patent: Oct. 12, 2010

(54) ZOOM LENS AND IMAGE CAPTURING MODULE USING SAME

(75) Inventors: Te-Lun Hsu, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/492,418

(22) Filed: Jun. 26, 2009

(30) Foreign Application Priority Data

Jun. 4, 2009 (CN) .................. 2009 1 0302917

(51) Int. Cl.
G02B 15/14 (2006.01)
(52) U.S. Cl. .................. 359/683; 359/676; 359/684; 359/685; 359/713; 359/756; 359/757
(58) Field of Classification Search .................. 359/676, 359/683–685, 713, 756, 757
See application file for complete search history.

(56) References Cited

U.S. PATENT DOCUMENTS

| | | | | |
|---|---|---|---|---|
| 5,606,459 A | * | 2/1997 | Nakatsuji | 359/683 |
| 5,717,526 A | * | 2/1998 | Ohtake | 359/683 |
| 6,215,599 B1 | * | 4/2001 | Ohtake | 359/688 |
| 6,646,803 B2 | * | 11/2003 | Hayakawa et al. | 359/676 |
| 6,825,989 B2 | * | 11/2004 | Uzawa et al. | 359/684 |
| 7,532,410 B2 | | 5/2009 | Kawana | |
| 2005/0190447 A1 | * | 9/2005 | Misaka | 359/676 |
| 2006/0203356 A1 | * | 9/2006 | Fujimoto et al. | 359/685 |

* cited by examiner

*Primary Examiner*—Evelyn A. Lester
(74) *Attorney, Agent, or Firm*—Frank R. Niranjan (57) ABSTRACT

A zoom lens includes, in order from an object side to an image side, a first lens group having positive refractive power, a second lens group having negative refractive power, a third lens group having negative refractive power, a fourth lens group having positive refractive power, a fifth lens group having positive refractive power, and a sixth lens group having positive refractive power. The zoom lens satisfies the following conditions: (1) 25<TT/fw<27; (2) 8.5 mm<BFL<12.5 mm; and (3) (V2+V5)−(V1+V6)>60. TT is a distance from the object side of the first lens group to the image side of the sixth lens group, fw is a shortest focal length of the zoom lens, BFL is a distance from the image side of the sixth lens group to the imaging sensor, and V1, V2, V5, V6 are Abbe numbers of the first, second, fifth, and sixth lens group, respectively.

20 Claims, 15 Drawing Sheets

ZOOM LENS AND IMAGE CAPTURING MODULE USING SAME

BACKGROUND

1. Technical Field

The disclosure relates to imaging technology and, particularly, to a zoom lens and an image capturing module with reduced overall length and high resolution.

2. Description of Related Art

To optimize image quality of an image capturing module used in an internet protocol (IP) camera, manufacturers tend to employ imaging lenses with high resolution and minimized overall length (the distance between the object-side surface of the imaging lens and the image plane of the image capturing module) to fill user demand for compact devices. There are factors that affect both the resolution and the overall length of the imaging lens, such as the number and positions of lenses employed, the optical power distribution of the employed lenses, and the shape of each employed lens. To achieve a smaller IP camera, the number of lenses can be reduced to decrease the overall length of the imaging lens, but resolution will suffer. To achieve better image capturing ability, generally, increasing the number of the lenses which have high resolution, but also increases the overall length of the image capturing modules.

Therefore, it is desirable to provide a zoom lens and an image capturing module, which can overcome or at least alleviate the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
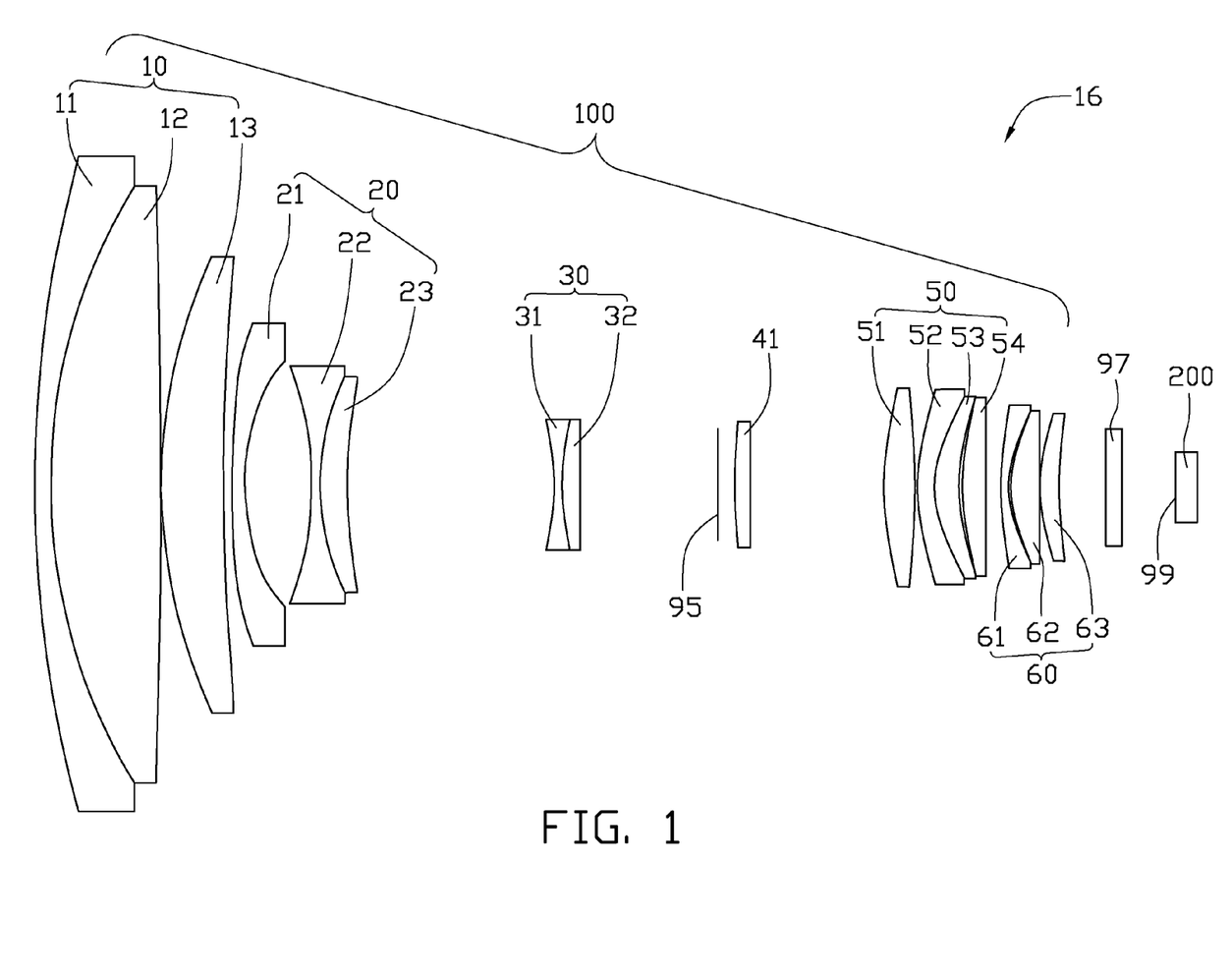
FIG. 1 is a schematic view of an embodiment of an image capturing module, the image capturing module including an embodiment of a zoom lens at a wide-angle position.
Figure 2:
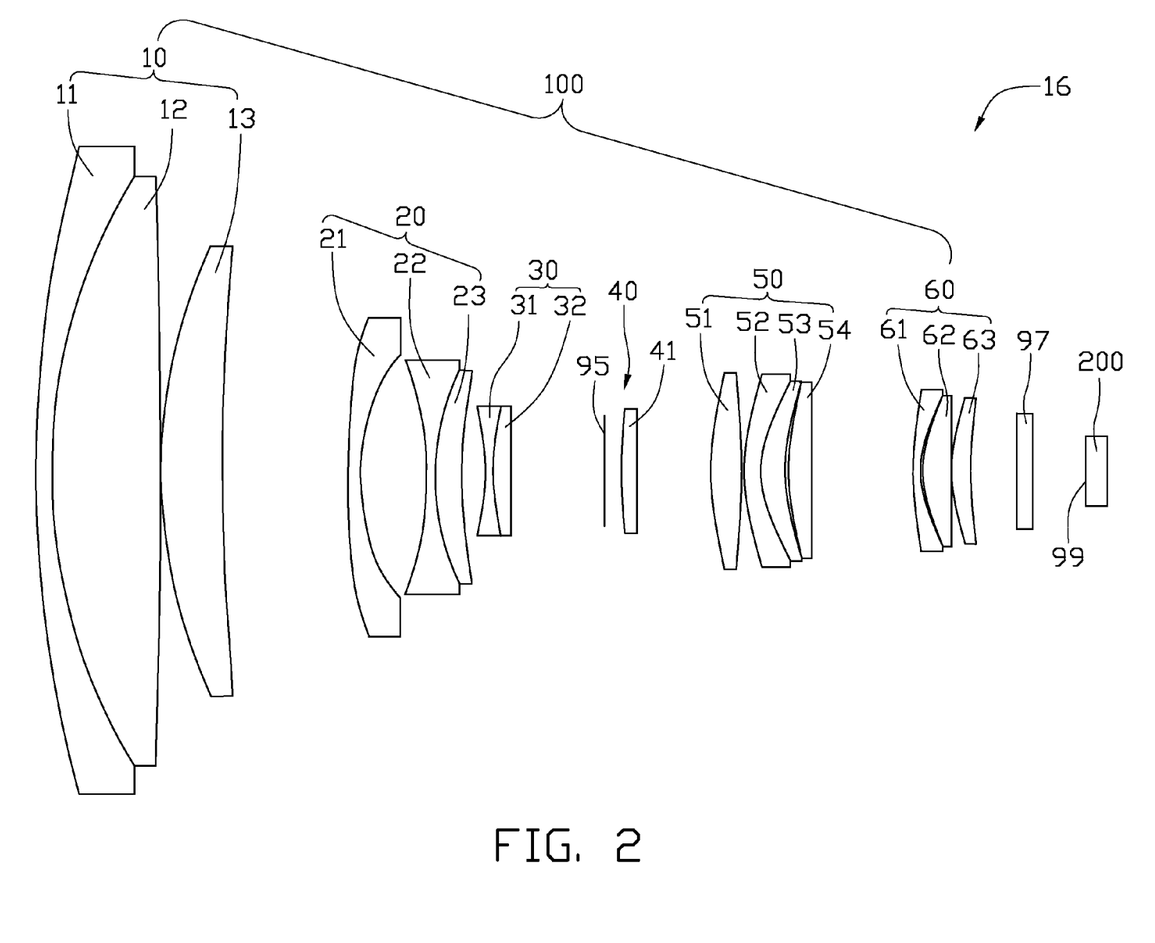
FIG. 2 is similar to FIG. 1, but showing the zoom lens at a medium-angle position.
Figure 3:
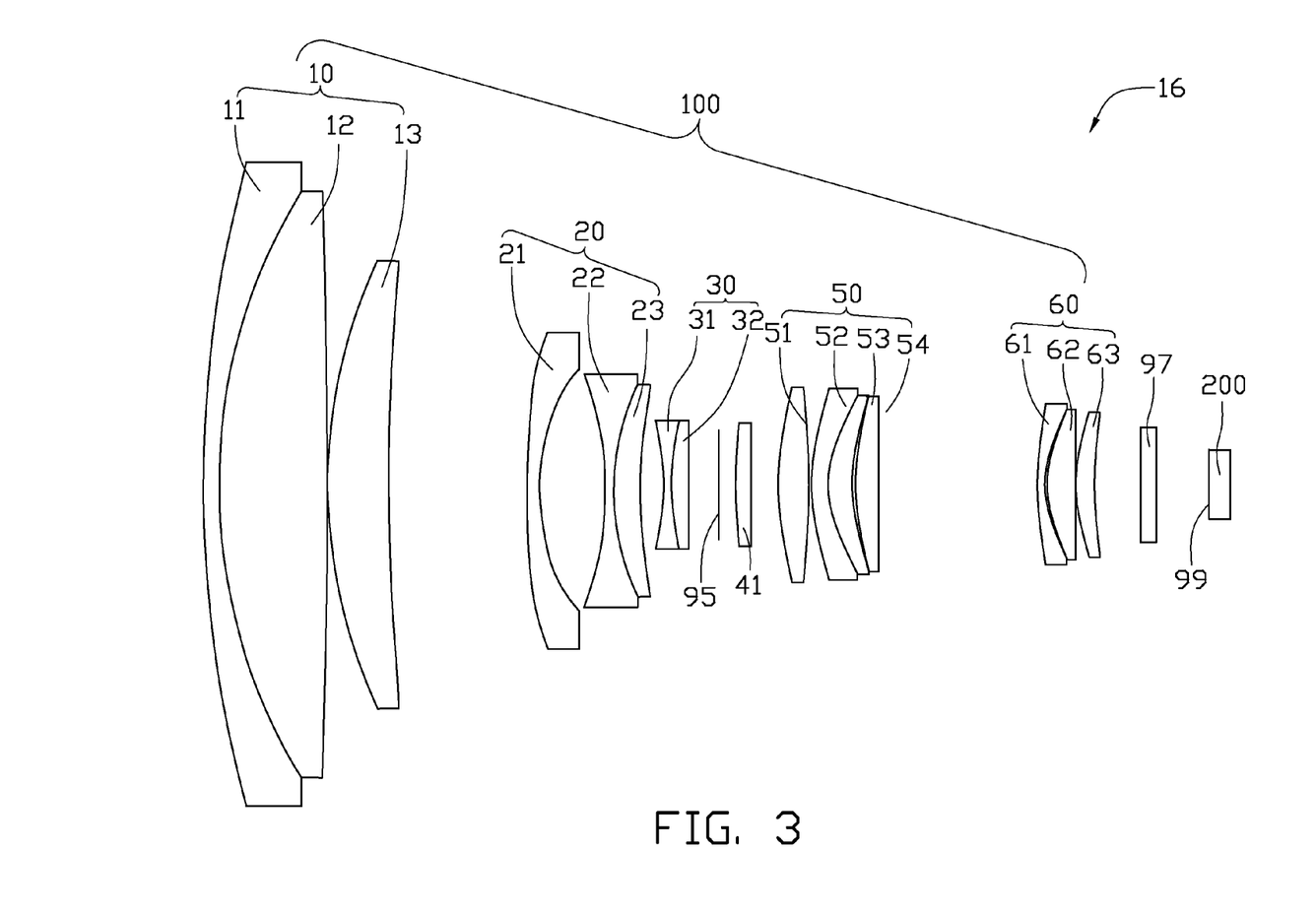
FIG. 3 is similar to FIG. 1, but showing the zoom lens at a telephoto position.

Referring to FIGS. 1-3, an embodiment of an image capturing module 16 includes a zoom lens 100 and a sensor 200 arranged at an image plane 99 of the image capturing module 16. The zoom lens 100 includes, in order from the object side to the image side thereof, a first lens group 10, a second lens group 20, a third lens group 30, a fourth lens group 40, a fifth lens group 50 and a sixth lens group 60. Each of the first lens group 10, the fourth lens group 40, the fifth lens group 50 and the sixth lens group 60 has positive refractive power, while each of the second lens group 20 and the third lens group 30 has negative refractive power. In this embodiment, the zoom lens 100 is used in an IP camera (not shown).

In assembly, the lens groups 10-60 are coaxially assembled into a lens accommodator (not shown), e.g., a lens barrel, and thereby have a common optical axis. The first lens group 10, the fourth lens group 40 and the sixth lens group 60 are stationary along the optical axis thereof, while the second lens group 20, the third lens group 30 and the fifth lens group 50 can move along the optical axis. Thereby, the effective focal length of the zoom lens 100 is variable by moving any one or more of the second lens group 20, the third lens group 30 and the fifth lens group 50.

The first lens group 10 includes, in order from the object side to the image side, a first lens 11 having negative refractive power, a second lens 12 having positive refractive power, and a third lens 13 having positive refractive power. In the present embodiment, the first lens 11 and the second lens 12 are adhered together to form a single unit.

The second lens group 20 includes, in order from the object side to the image side, a fourth lens 21 having negative refractive power, a fifth lens 22 having negative refractive power, and a sixth lens 23 having positive refractive power. In the present embodiment, the fifth lens 22 and the sixth lens 23 are adhered together to form a single unit.

The third lens group 30 includes, in order from the object side to the image side, a seventh lens 31 having negative refractive power, and an eighth lens 32 having positive refractive power. In the present embodiment, the seventh lens 31 and the eighth lens 32 are adhered together to form a single unit.

The fourth lens group 40 includes a ninth lens 41 having positive refractive power.

The fifth lens group 50 includes, in order from the object side to the image side, a tenth lens 51 having positive refractive power, an eleventh lens 52 having negative refractive power, a twelfth lens 53 having negative refractive power, and a thirteenth lens 54 having negative refractive power. In the present embodiment, the eleventh lens 52 and the twelfth lens 53 are adhered together to form a single unit.

The sixth lens group 60 includes, in order from the object side to the image side, a fourteenth lens 61 having negative refractive power, a fifteenth lens 62 having positive refractive power, and a sixteenth lens 63 having negative refractive power.

The zoom lens 100 further includes an aperture stop 95 and an infrared filter 97. The aperture stop 95 is arranged between the third lens group 30 and the fourth lens group 40 to reduce light flux into the fourth lens group 40. For cost reduction, the aperture stop 95 may be formed directly on the surface of the ninth lens 41 of the fourth lens group 40 facing the object side of the zoom lens 100. In practice, a peripheral portion of the surface of the ninth lens 41 through which light rays should not be transmitted is coated with an opaque material, which functions as the aperture stop 95. The infrared filter 97 is arranged between the sixth lens group 60 and the image plane 99 for filtering out infrared rays coming into the image sensor 200.

In order to obtain the zoom lens 100 with a short overall length, a high zoom ratio, and a high resolution, the zoom lens 100 satisfies the following conditions:

$$25 < TT/fw < 27; \quad (1)$$

$$8.5 \text{ mm} < BFL < 12.5 \text{ mm}; \quad (2) \text{ and}$$

$$(V2+V5)-(V1+V6) > 60 \quad (3)$$

wherein TT is a distance from the object side of the first lens group 10 to the image side of the sixth lens group 60; fw is a shortest focal length of the zoom lens 100; BFL is a distance from the image side of the sixth lens group 60 to the imaging sensor 200; V1 is an Abbe number of the first lens group 10, V2 is an Abbe number of the second lens group 20, V5 is an Abbe number of the fifth lens group 50, and V6 is an Abbe number of the sixth lens group 60.

The first condition (1) is used for limiting the overall length of the zoom lens 100 by providing the relationship between the TT and the focal length fw of the zoom lens 100 at the wide-angle position. The second condition (2) is used for limiting the black focal length (BFL) of the zoom lens 100 in a standard range to be used for a standard interface of the image sensor 200. The third condition (3) is used for ensuring low chromatic aberration in images after light is transmitted through the first lens group 10, the second lens group 20, the fifth lens group 50 and the sixth lens group 60.

Furthermore, each surface of the fourth lens 21 and the ninth lens 41 is aspheric to improve the optical performance of the zoom lens 100. The shape of each aspheric surface is determined by formula (4) below. Formula (4) is based on a Cartesian coordinate system, with the vertex of the surface being the origin, and the optical axis extending from the vertex being the x-axis.

$$x = \frac{ch^2}{1+\sqrt{1-(k+1)c^2h^2}} + \sum A_i h^i \quad (4)$$

wherein, h is a height from the optical axis to the surface, c is a vertex curvature, k is a conic constant, and Ai are i-th order correction coefficients of the aspheric surfaces.

Examples of the zoom lens 100 will be described below with reference to FIGS. 4-15. It is to be understood that the disclosure is not limited to these examples. The following are symbols used in each exemplary embodiment.

R: radius of curvature;
d: distance between surfaces on the optical axis of the zoom lens 100;
nd: refractive index of lens;
V: Abbe number;
F: focal length of the zoom lens 100;
FNo: F number;
2ω: field angle.

Example 1

Tables 1-3 show the lens data of Example 1.

TABLE 1

| Surfaces | R (mm) | d (mm) | nd | V |
|---|---|---|---|---|
| Object-side surface of the first lens | 100.69 | 1.5 | 1.85 | 23.8 |
| Interface between the first and second lenses | 46.87 | 10.2 | 1.6 | 60.6 |
| Image-side surface of the second lens | −775.33 | 0.1 | — | — |
| Object-side surface of the third lens | 43.55 | 5.71 | 1.68 | 55.3 |
| Image-side surface of the third lens | 168.21 | — | — | — |
| Object-side surface of the fourth lens | 189.78 | 1.2 | 1.83 | 37.3 |
| Image-side surface of the fourth lens | 21.9 | 6.18 | — | — |
| Object-side surface of the fifth lens | −26.82 | 0.8 | 1.69 | 53.2 |
| Interface between the fifth and sixth lenses | 20.29 | 2.48 | 1.85 | 23.8 |
| Image-side surface of the sixth lens | 41.71 | — | — | — |
| Object-side surface of the seventh lens | −23.39 | 0.8 | 1.69 | 50.8 |
| Interface between the seventh and eighth lenses | 22.6 | 1.6 | 1.85 | 23.8 |
| Image-side surface of the eighth lens | 429.42 | — | — | — |
| Surface of the aperture stop | ∞ | 1.5 | — | — |
| Object-side surface of the ninth lens | 39.8 | 1.48 | 1.73 | 48.9 |
| Image-side surface of the ninth lens | −252.64 | 18.02 | — | — |
| Object-side surface of the tenth lens | 28.57 | 2.96 | 1.57 | 53 |
| Interface between the tenth and eleventh lenses | −68.08 | 0.15 | — | — |
| Image-side surface of the eleventh lens | 21.64 | 1.56 | 1.85 | 23.8 |
| Object-side surface of the twelfth lens | 12.26 | 2.36 | 1.54 | 55.1 |
| Image-side surface of the twelfth lens | 20.41 | 0.29 | — | — |
| Object-side surface of the thirteenth lens | 24.67 | 2.29 | 1.57 | 56.4 |
| Image-side surface of the thirteenth lens | −187.54 | — | — | — |
| Object-side surface of the fourteenth lens | 29.88 | 0.8 | 1.85 | 23.8 |
| Image-side surface of the fourteenth lens | 11.47 | 0.22 | — | — |
| Object-side surface of the fifteenth lens | 12.44 | 2.69 | 1.5 | 81.5 |
| Image-side surface of the fifteenth lens | 560.22 | 0.1 | — | — |
| Object-side surface of the sixteenth lens | 18.38 | 1.63 | 1.64 | 55.4 |
| Image-side surface of the sixteenth lens | 35.78 | 4.37 | — | — |
| Object-side surface of the cover glass | ∞ | 1.5 | 1.52 | 64.1 |
| Image-side surface of the cover glass | ∞ | 6.57 | — | — |
| Image plane | ∞ | — | — | — |

TABLE 2

| Lens state | F (mm) | FNo | 2ω | D5 (mm) | D10 (mm) | D13 (mm) | D15 (mm) | D22 (mm) |
|---|---|---|---|---|---|---|---|---|
| Wide-angle (see FIG. 1) | 4.5 | 1.8 | 68.9° | 0.85 | 19.24 | 19.99 | 18.02 | 1.21 |
| Medium-angle (see FIG. 2) | 39.5 | 2.4 | 8.59° | 31.74 | 2.65 | 5.69 | 7.5 | 11.72 |
| telephoto (see FIG. 3) | 79 | 2.8 | 4.28° | 36.46 | 2.75 | 0.87 | 2.8 | 16.42 |

TABLE 3

| Surfaces | Aspherical coefficients |
|---|---|
| Object side surface of the fourth lens | k = 0; A4 = 0.0000658; A6 = −0.000000432; A8 = 0.00000000186; A10 = −0.0000000000023 |
| Image side surface of the fourth lens | k = 2.69; A4 = 0.0000415; A6 = −0.000000347; A8 = −0.000000000947; A10 = 0.00000000000508 |
| Object side surface of the ninth lens | k = 0; A4 = 0.0000202; A6 = 0.000000137; A8 = 0.00000000808; A10 = −0.0000000000976 |
| Image side surface of the ninth lens | k = −98.46; A4 = 0.0000464; A6 = 0.000000143; A8 = 0.00000000844; A10 = −0.0000000000934 |

Figure 4:
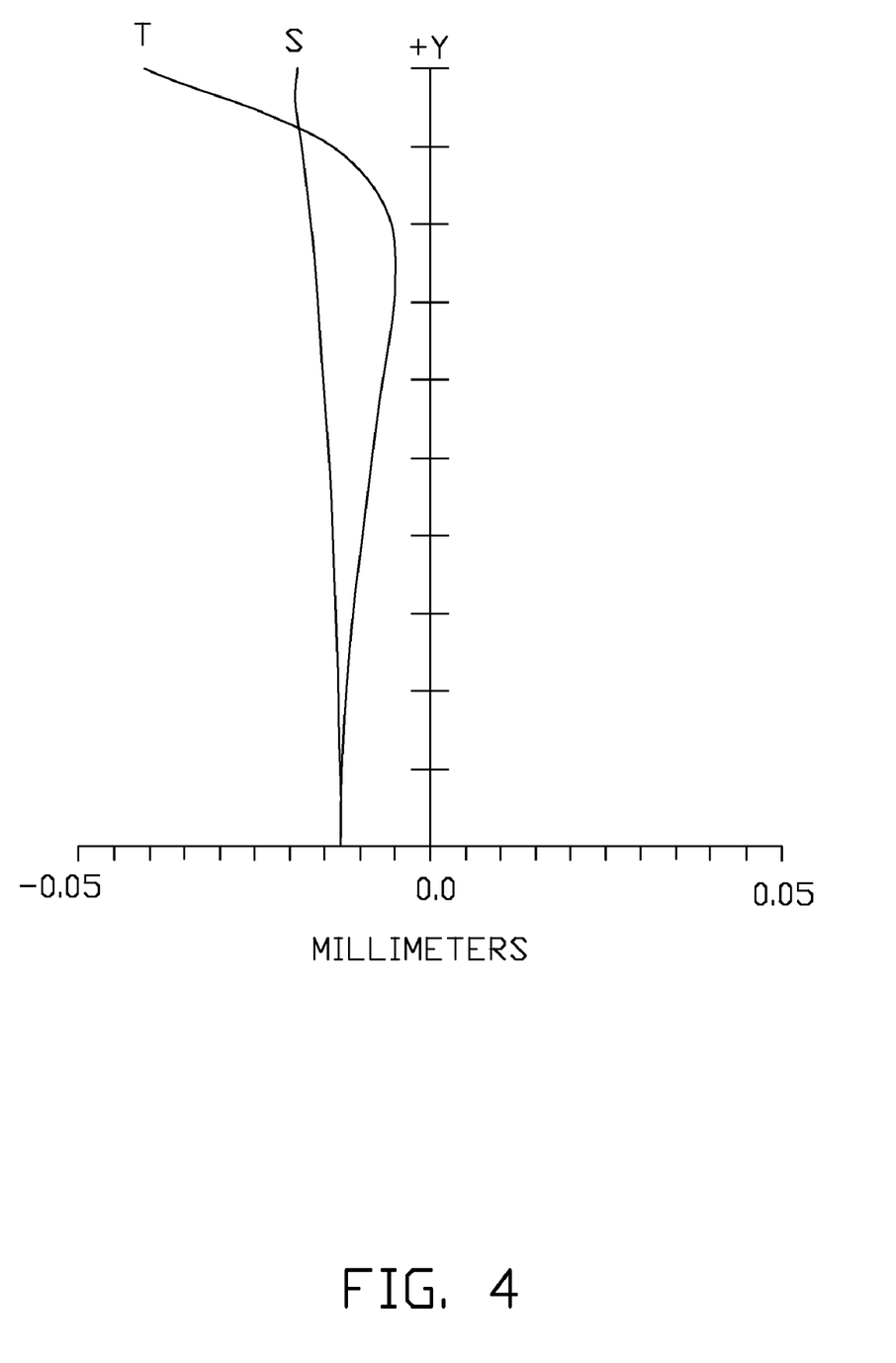
FIG. 4 is a field curvature diagram of the zoom lens of FIG. 1, according to a first embodiment.
Figure 5:
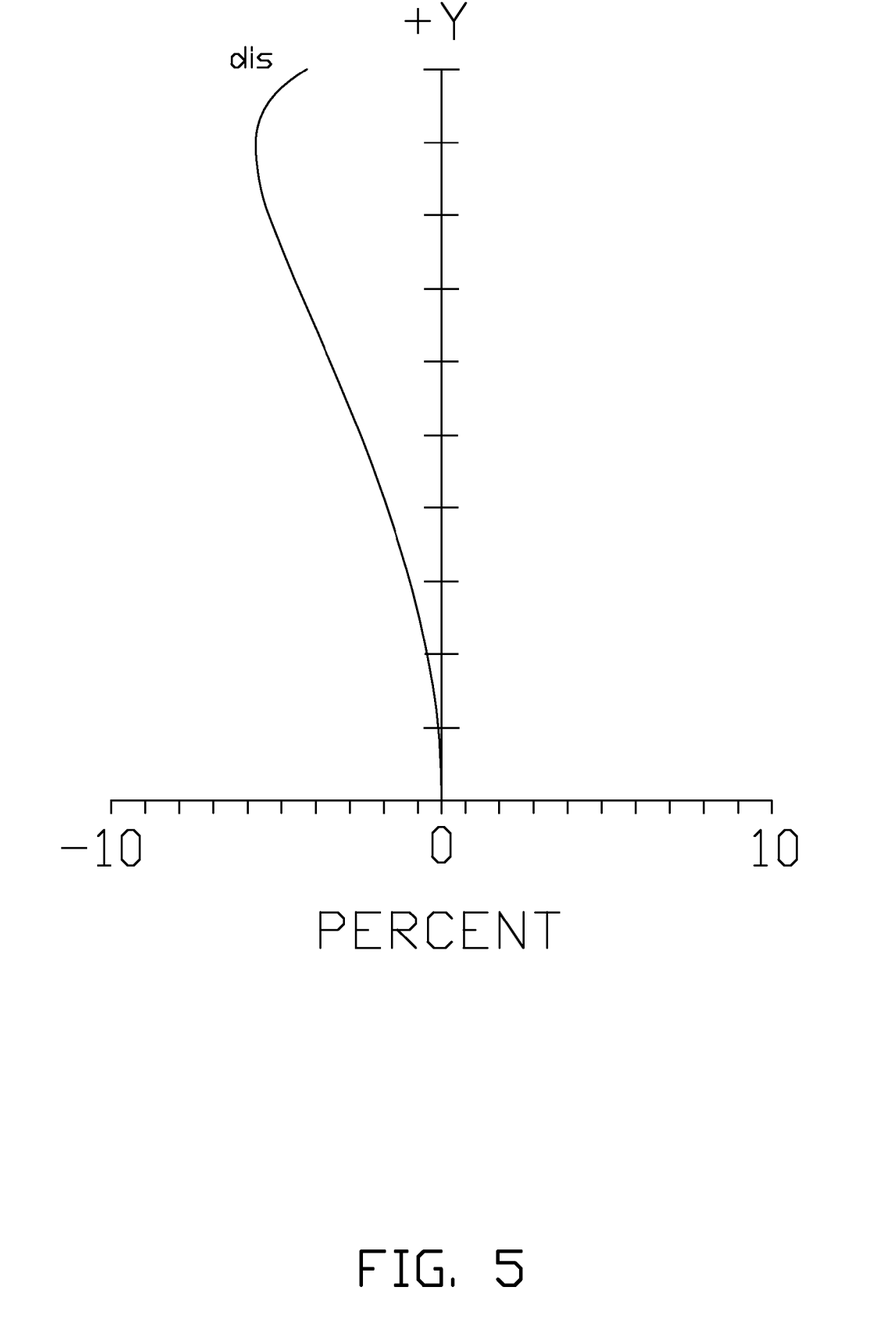
FIG. 5 is a distortion diagram of the zoom lens of FIG. 1, according to the first embodiment.
Figure 6:
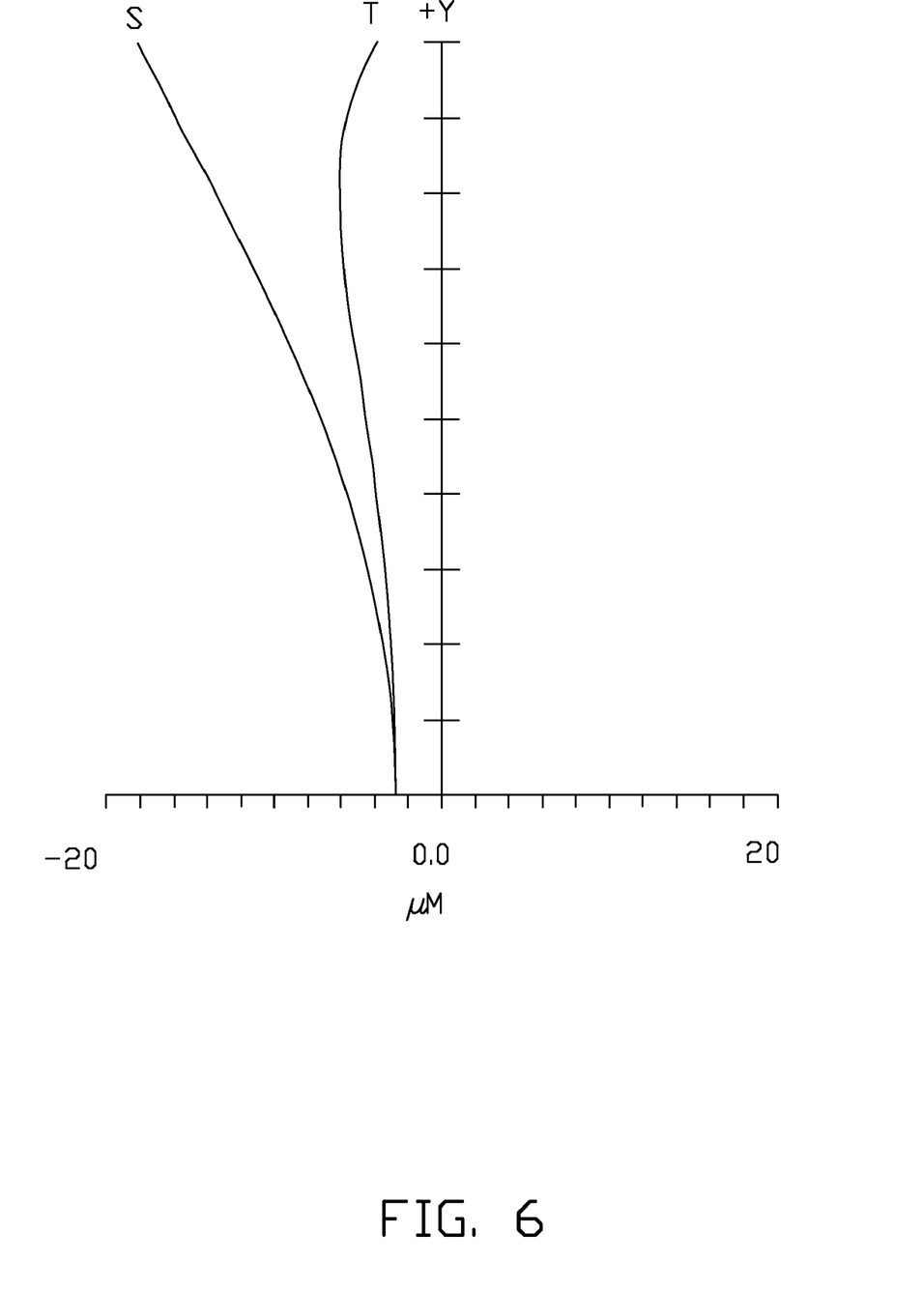
FIG. 6 is a field curvature diagram of the zoom lens of FIG. 2, according to the first embodiment.
Figure 7:
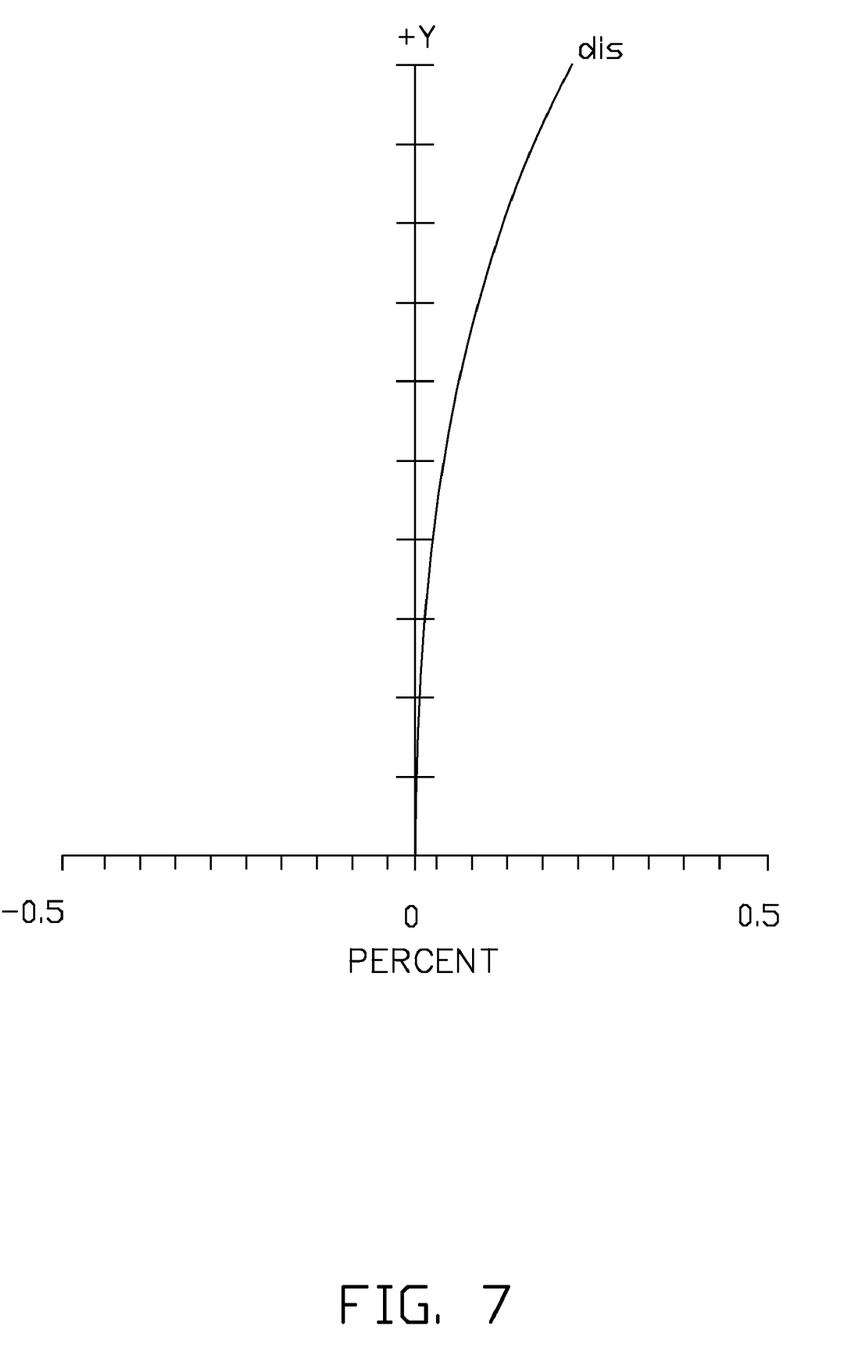
FIG. 7 is a distortion diagram of the zoom lens of FIG. 2, according to the first embodiment.
Figure 8:
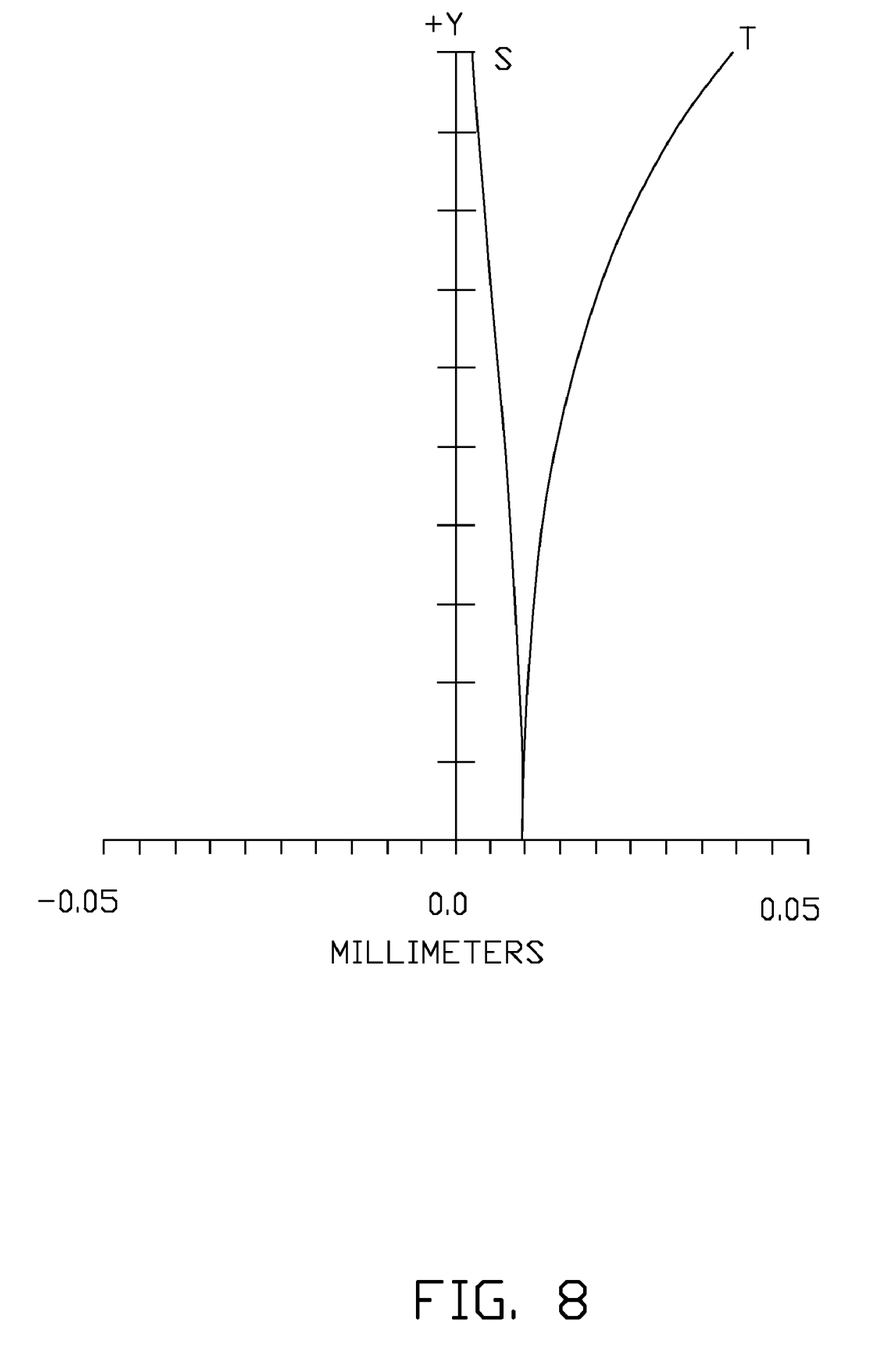
FIG. 8 is a field curvature diagram of the zoom lens of FIG. 3, according to the first embodiment.
Figure 9:
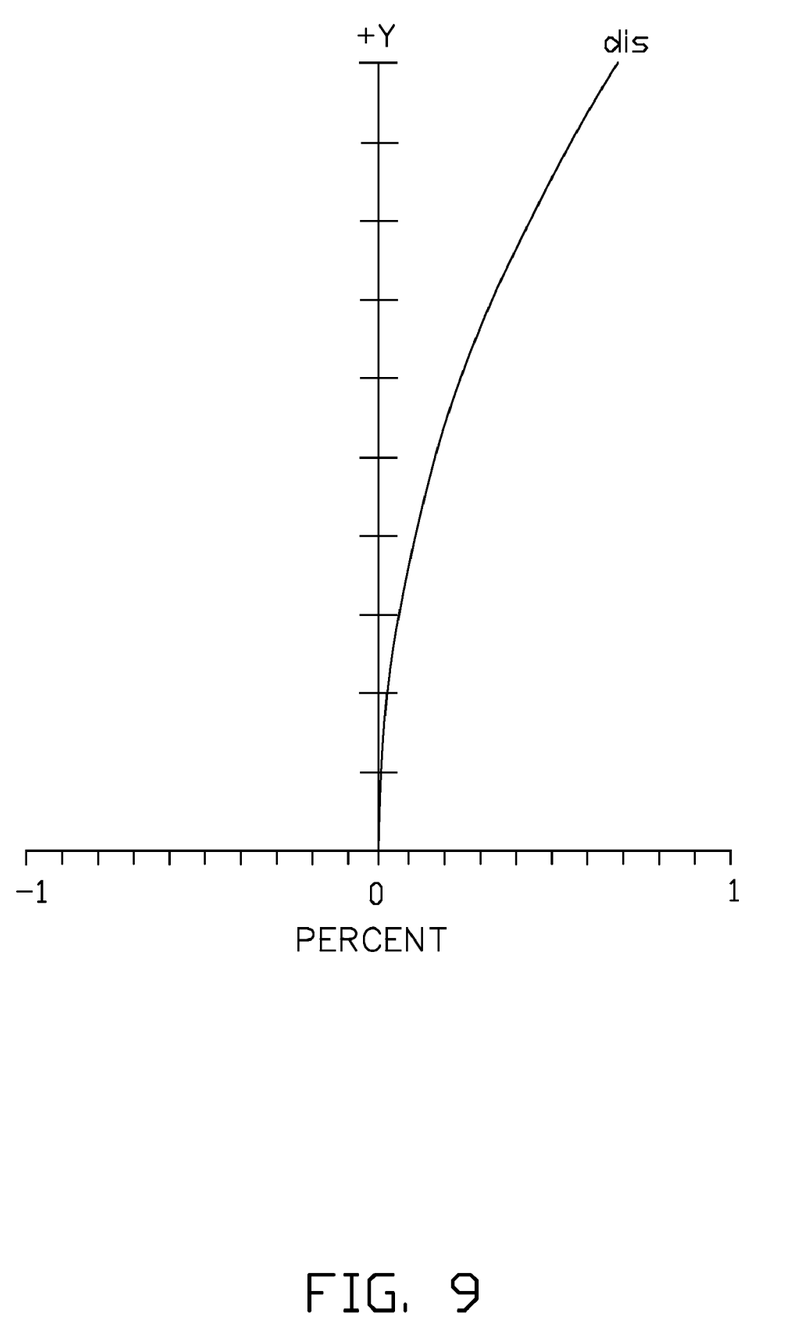
FIG. 9 is a distortion diagram of the zoom lens of FIG. 3, according to the first embodiment.
Figure 10:
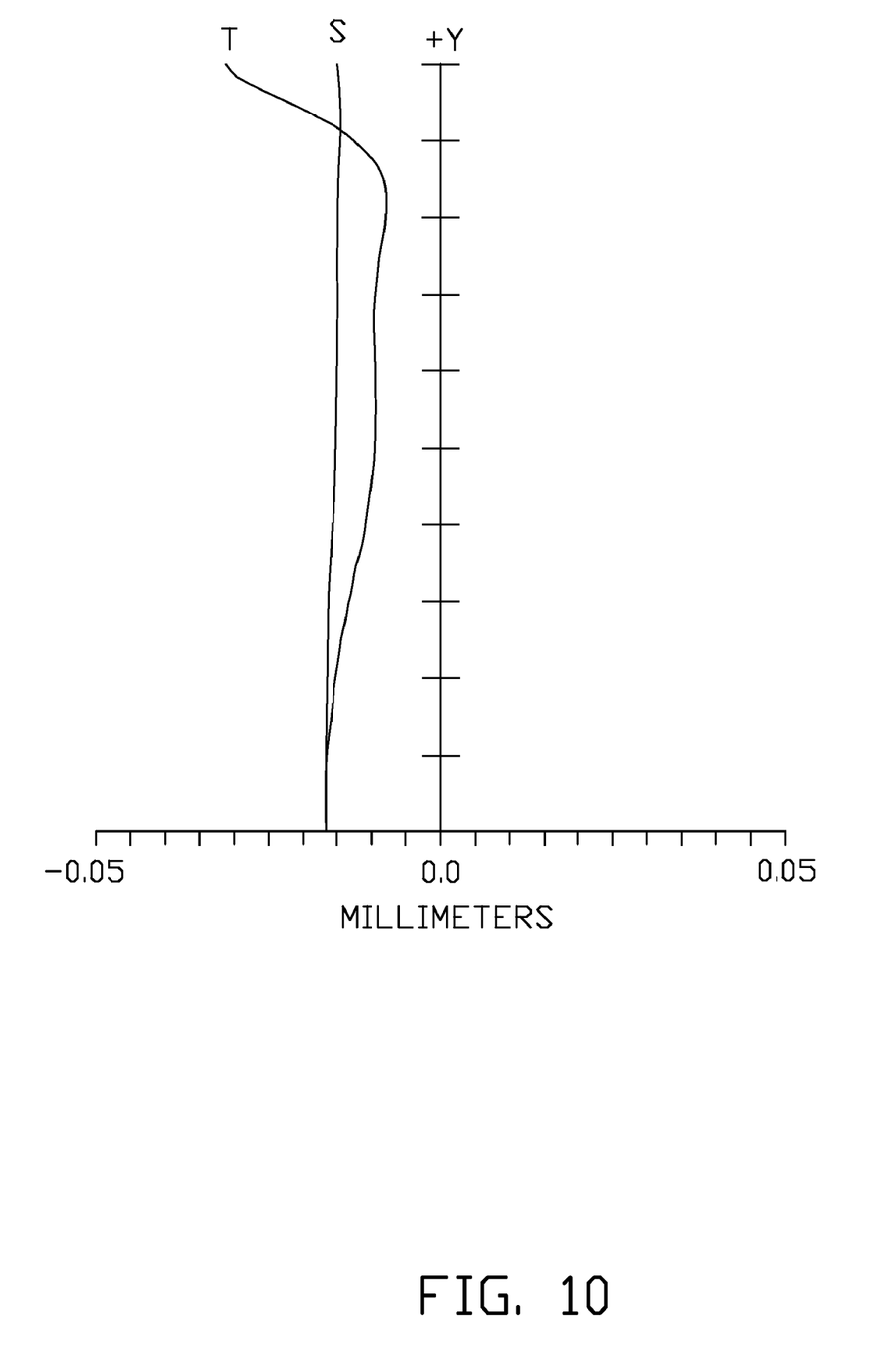
FIG. 10 is a field curvature diagram of the zoom lens of FIG. 1, according to a second embodiment.
Figure 11:
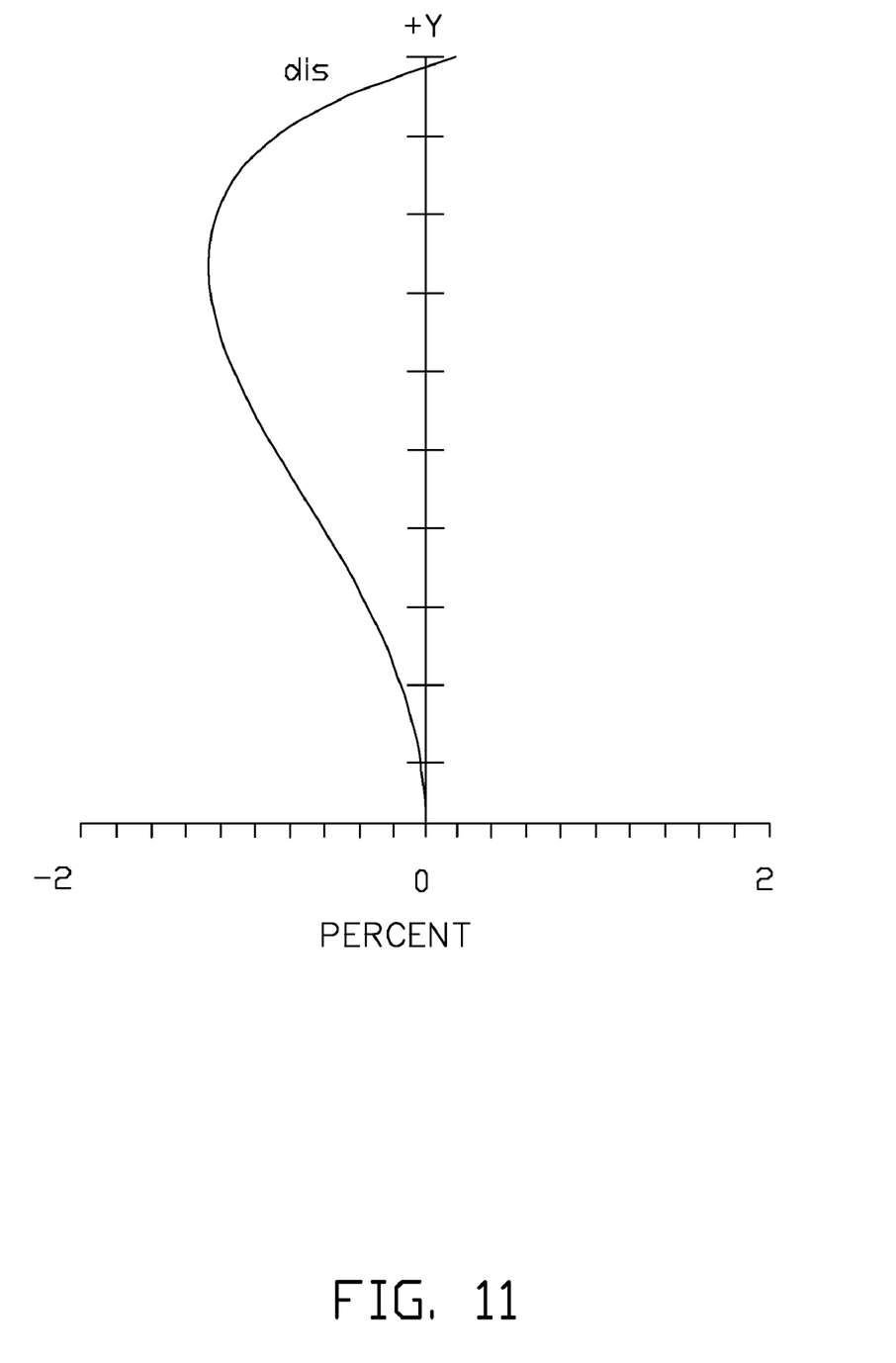
FIG. 11 is a distortion diagram of the zoom lens of FIG. 1, according to the second embodiment.
Figure 12:
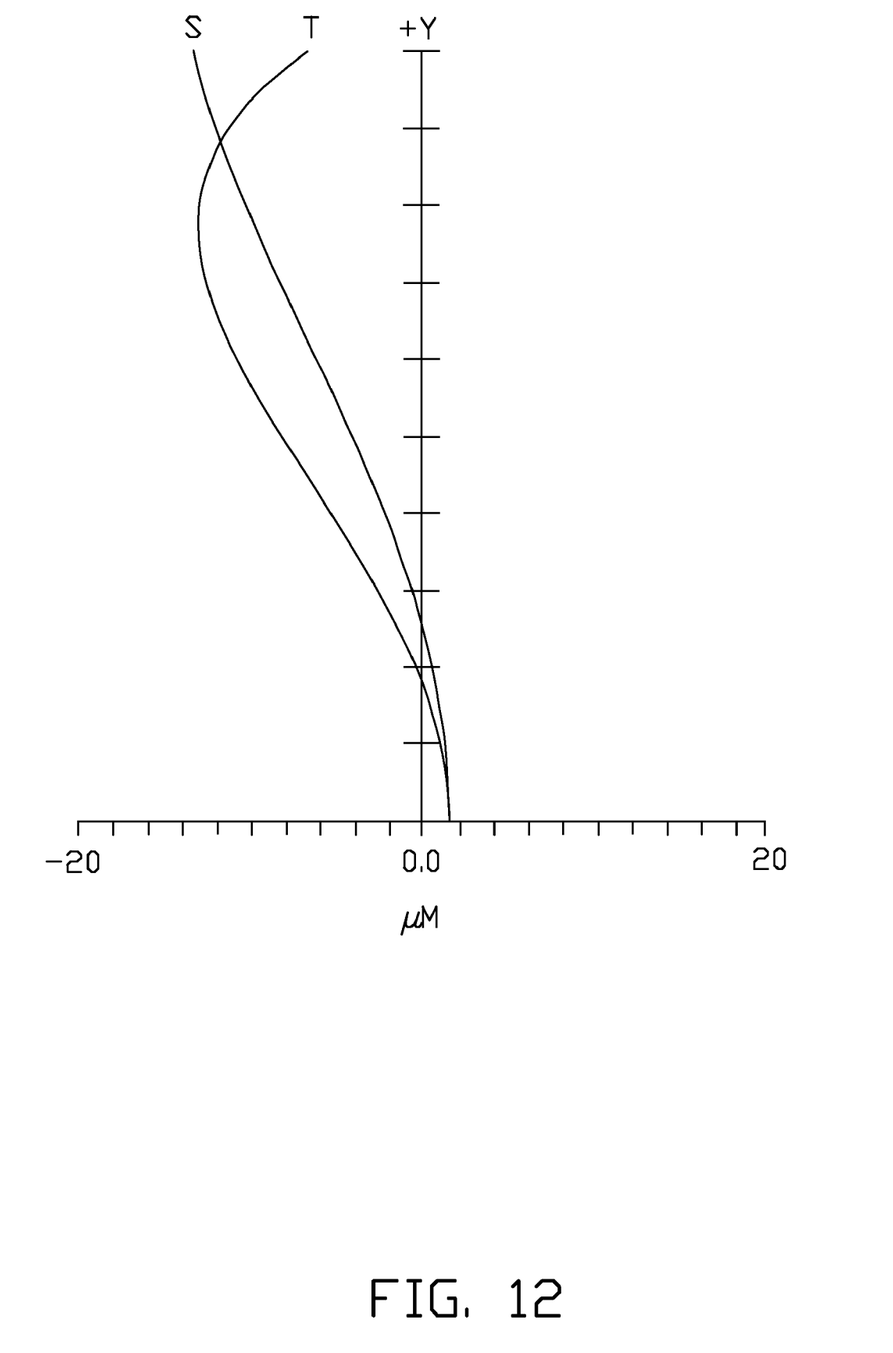
FIG. 12 is a field curvature diagram of the zoom lens of FIG. 2, according to the second embodiment.
Figure 13:
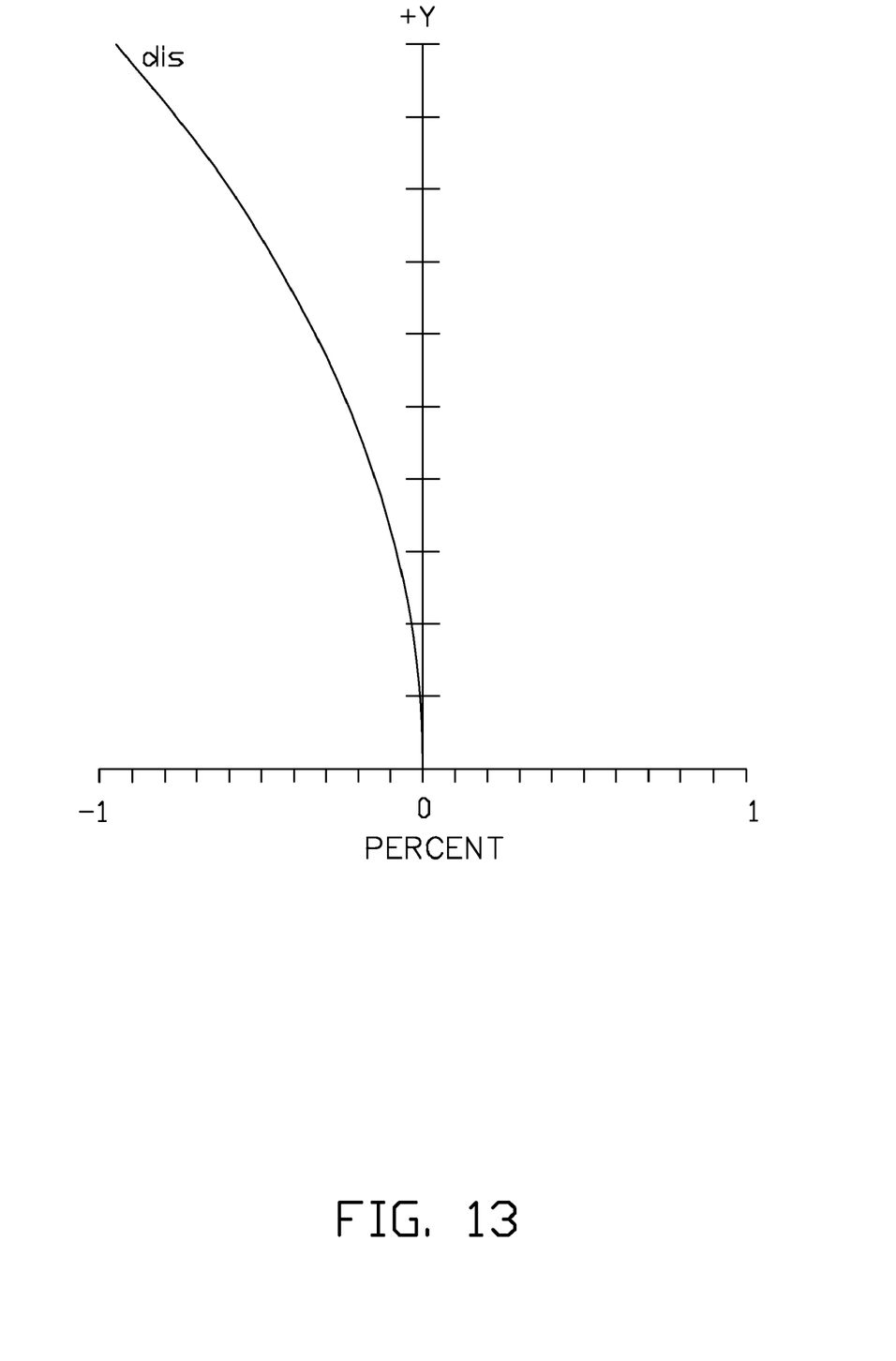
FIG. 13 is a distortion diagram of the zoom lens of FIG. 2, according to the second embodiment.
Figure 14:
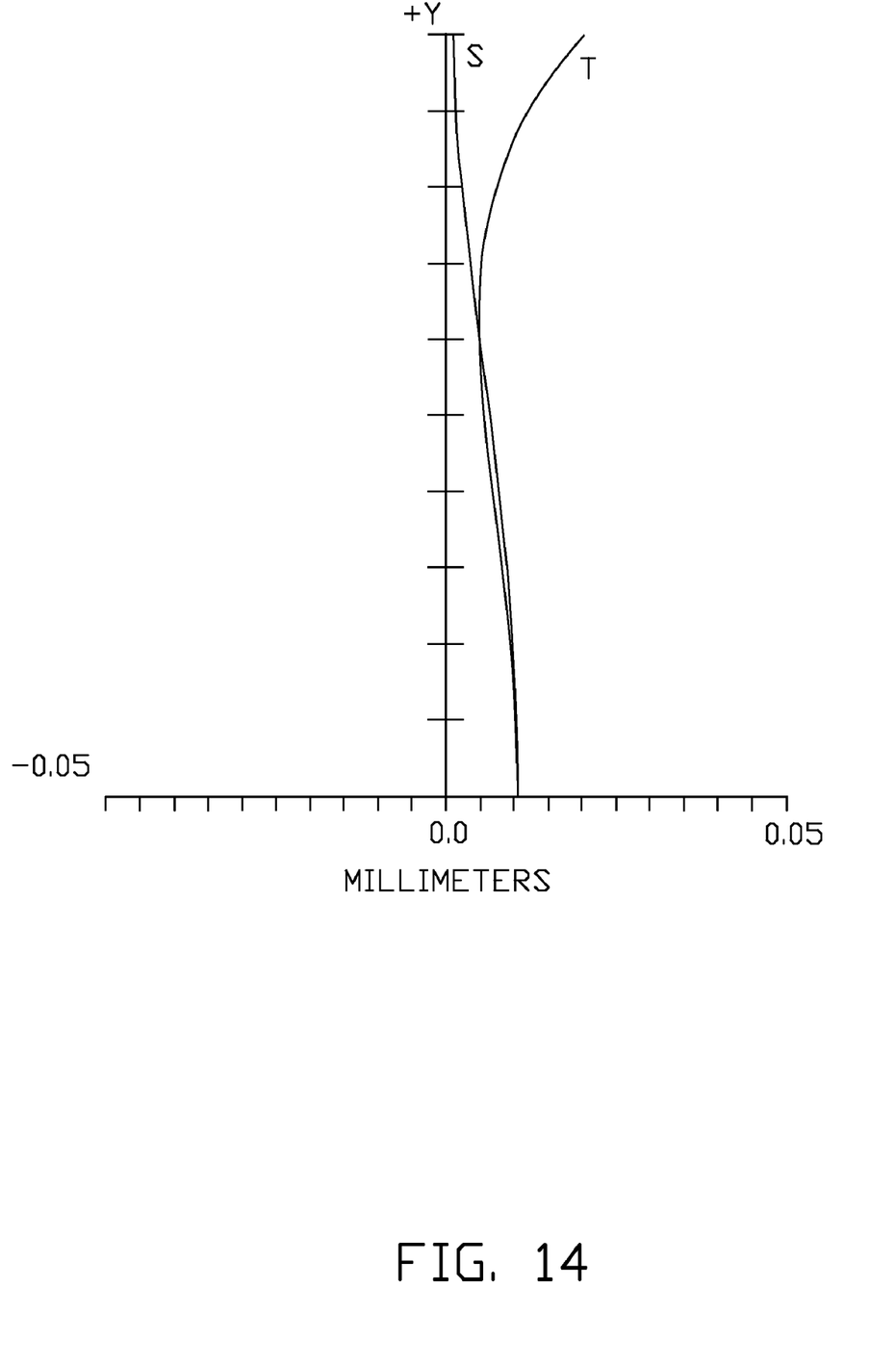
FIG. 14 is a field curvature diagram of the zoom lens of FIG. 3, according to the second embodiment.
Figure 15:
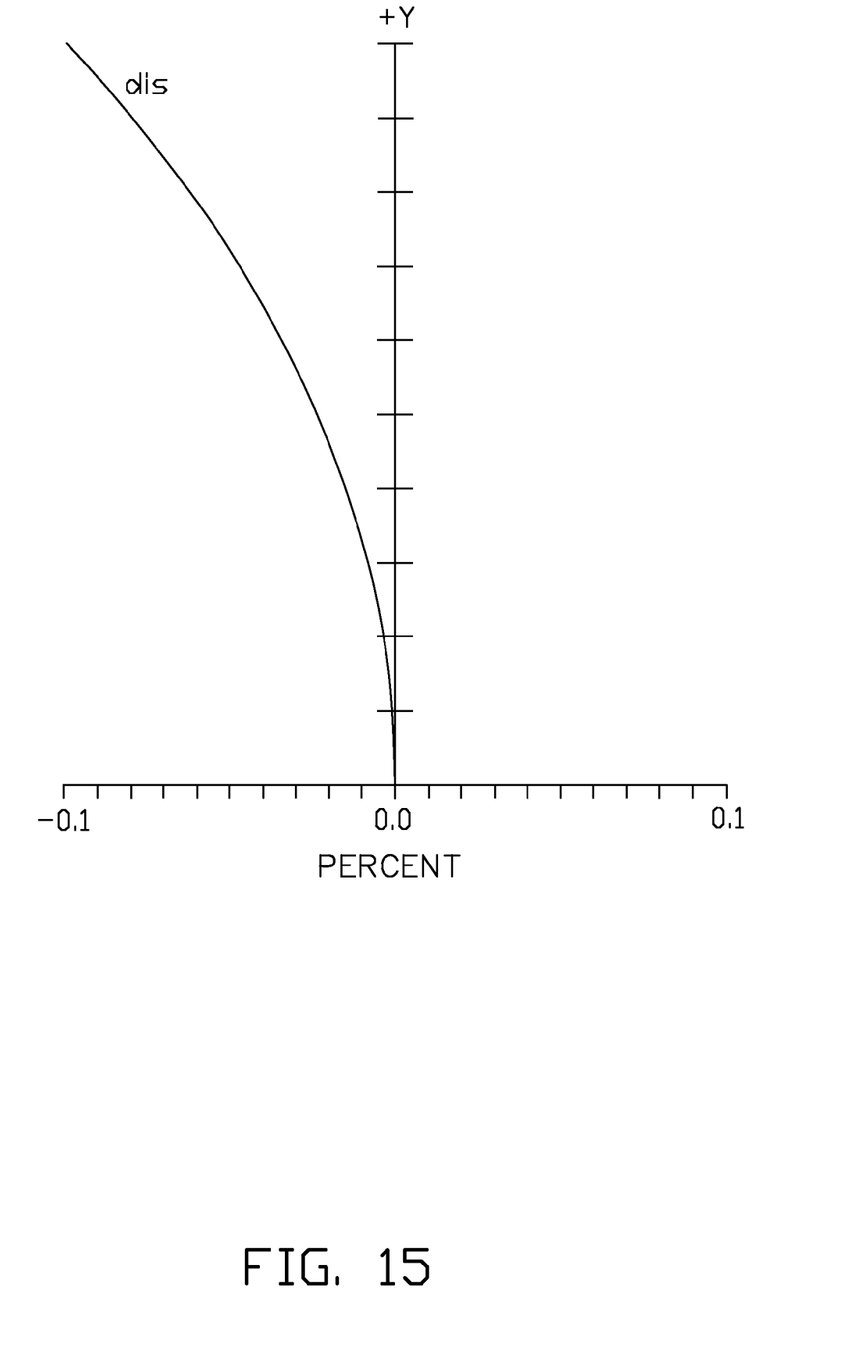
FIG. 15 is a distortion diagram of the zoom lens of FIG. 3, according to the second embodiment.

The curves t and s of FIGS. 4, 6, 8 are the tangential field curvature curve and the sagittal field curvature curve respectively of the zoom lens 100. The 'dis' curves in FIGS. 5, 7, 9, are distortion curves of the zoom lens 100. As shown in FIGS. 4-9, field curvature occurring in the zoom lens 100 over the entire zoom range including the wide-angle state, the medium state, and the telephoto state, is controlled to be within the range from −0.05 mm to 0.05 mm; and distortion is limited to −6% to 6%.

Referring to FIGS. 10-15, another detailed example of the zoom lens 100 is given below in company with FIGS. 1-3, but it should be noted that the zoom lens 100 is not limited to this example.

Example 2

Tables 4-7 show the lens data of Example 2.

TABLE 4

| Surfaces | R (mm) | D (mm) | Nd | Vd |
|---|---|---|---|---|
| Object-side surface of the first lens | 85.91 | 1.5 | 1.85 | 23.8 |
| Interface between the first and second lenses | 49.04 | 10.2 | 1.6 | 60.6 |
| Image-side surface of the second lens | ∞ | 0.1 | — | — |
| Object-side surface of the third lens | 42.87 | 5.74 | 1.65 | 56.2 |
| Image-side surface of the third lens | 96.19 | — | — | — |
| Object-side surface of the fourth lens | 98.14 | 0.8 | 1.83 | 37.3 |
| Image-side surface of the fourth lens | 13.27 | 6.61 | — | — |
| Object-side surface of the fifth lens | −36.03 | 0.8 | 1.69 | 50.8 |
| Interface between the fifth and sixth lenses | 14.16 | 4.52 | 1.85 | 23.8 |
| Image-side surface of the sixth lens | 84.63 | 2.87 | — | — |
| Object-side surface of the seventh lens | −34.33 | 0.8 | 1.72 | 38 |
| Interface between the seventh and eighth lenses | 22.68 | 1.71 | 1.85 | 23.8 |
| Image-side surface of the eighth lens | 161.81 | — | — | — |
| Surface of the aperture stop | ∞ | 1.5 | — | — |
| Object-side surface of the ninth lens | 29.41 | 1.71 | 1.73 | 48.9 |
| Image-side surface of the ninth lens | 464.3 | — | — | — |
| Object-side surface of the tenth lens | 45.24 | 3.33 | 1.59 | 61.1 |
| Interface between the tenth and eleventh lenses | −38.73 | 0.15 | — | — |
| Image-side surface of the eleventh lens | 32.11 | 0.9 | 1.85 | 23.8 |
| Object-side surface of the twelfth lens | 14.44 | 2.73 | 1.52 | 64.1 |
| Image-side surface of the twelfth lens | 28.65 | 0.2 | — | — |
| Object-side surface of the thirteenth lens | 20.74 | 2.66 | 1.59 | 61.1 |
| Image-side surface of the thirteenth lens | 165.78 | — | — | — |
| Object-side surface of the fourteenth lens | 58.71 | 0.8 | 1.88 | 40.8 |
| Image-side surface of the fourteenth lens | 14.27 | 0.34 | — | — |
| Object-side surface of the fifteenth lens | 16.63 | 2.74 | 1.54 | 59.5 |
| Image-side surface of the fifteenth lens | −179.57 | 1.47 | — | — |
| Object-side surface of the sixteenth lens | 19.24 | 4.26 | 1.59 | 61.1 |
| Image-side surface of the sixteenth lens | 43.48 | 4.4 | — | — |
| Object-side surface of the cover glass | ∞ | 1.5 | 1.52 | 64.1 |
| Image-side surface of the cover glass | ∞ | 6.6 | — | — |
| Image plane | ∞ | — | — | — |

TABLE 5

| Lens state | F(mm) | FNo | 2ω | D5 (mm) | D10 (mm) | D13 (mm) | D15 (mm) |
|---|---|---|---|---|---|---|---|
| Wide-angle | 5 | 1.8 | 61.7° | 0.85 | 37.4 | 9.54 | 14.84 |
| Medium-angle | 45 | 2.4 | 7.62° | 39.35 | 2.52 | 5.91 | 6.59 |
| Telephoto | 89 | 2.8 | 3.83° | 44.06 | 2.87 | 0.85 | 0.9 |

TABLE 6

| Surfaces | Aspheric coefficient |
|---|---|
| Object side surface of the fourth lens | k = 0; A4 = 0.0000310; A6 = −0.000000155; A8 = 0.000000000658; A10 = −0.00000000000139 |
| Image side surface of the fourth lens | k = −0.3841; A4 = 0.0000486; A6 = 0.000000199; A8 = −0.00000000118; A10 = 0.0000000000268 |
| Object side surface of the ninth lens | k = 0; A4 = −0.00000163; A6 = −0.0000000180; A8 = 0.00000000277; A10 = −0.0000000000320 |

TABLE 6-continued

| Surfaces | Aspheric coefficient |
|---|---|
| Image side surface of the ninth lens | k = −98.46; A4 = 0.0000275; A6 = −0.0000000303; A8 = 0.00000000315; A10 = −0.000000000337 |

As shown in FIGS. 10-15, field curvature occurring in the zoom lens 100 over the entire zoom range including the wide-angle state, the medium state, and the telephoto state is controlled to be within the range from −0.05 mm to 0.05 mm; and distortion is limited to −2% to 2%.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A zoom lens comprising, in order from an object side to an image side, a first lens group having positive refractive power, a second lens group having negative refractive power, a third lens group having negative refractive power, a fourth lens group having positive refractive power, a fifth lens group having positive refractive power, and a sixth lens group having positive refractive power; wherein the zoom lens satisfies the following conditions:

$$25 < TT/fw < 27; \quad (1)$$

$$8.5 \text{ mm} < BFL < 12.5 \text{ mm}; \quad (2) \text{ and}$$

$$(V2+V5)-(V1+V6) > 60, \quad (3)$$

wherein, TT is a distance from the object side of the first lens group to the image side of the sixth lens group; fw is a shortest focal length of the zoom lens; BFL is a distance from the image side of the sixth lens group to the imaging sensor; V1 is an Abbe number of the first lens group, V2 is an Abbe number of the second lens group, V5 is an Abbe number of the fifth lens group, and V6 is an Abbe number of the sixth lens group.

2. The zoom lens as claimed in claim 1, wherein the first lens group comprises, in order from the object side to the image side, a first lens having negative refractive power, a second lens having positive refractive power, and a third lens having positive refractive power.

3. The zoom lens as claimed in claim 2, wherein the first lens and the second lens are adhered together to form a single unit.

4. The zoom lens as claimed in claim 1, wherein the second lens group comprises, in order from the object side to the image side, a fourth lens having negative refractive power, a fifth lens having negative refractive power, and a sixth lens having positive refractive power.

5. The zoom lens as claimed in claim 4, wherein the fourth lens is an aspherical lens.

6. The zoom lens as claimed in claim 4, wherein the fifth lens and the sixth lens are adhered together to form a single unit.

7. The zoom lens as claimed in claim 1, wherein the third lens group comprises, in order from the object side to the image side, a seventh lens having negative refractive power and an eighth lens having positive refractive power.

8. The zoom lens as claimed in claim 7, wherein the seventh lens and the eighth lens are adhered together to form a single unit.

9. The zoom lens as claimed in claim 1, wherein the fourth lens group comprises a ninth lens having positive refractive power and is an aspherical lens.

10. The zoom lens as claimed in claim 1, wherein an aperture stop is arranged on the object side of the fourth lens group.

11. The zoom lens as claimed in claim 1, wherein the fifth lens group comprises, in order from the object side to the image side, a tenth lens having positive refractive power, an eleventh lens having negative refractive power, a twelfth lens having negative refractive power, and a thirteenth lens having negative refractive power.

12. The zoom lens as claimed in claim 11, wherein the eleventh lens and the twelfth lens are adhered together to form a single unit.

13. The zoom lens as claimed in claim 1, wherein the sixth lens group comprises, in order from the object side to the image side, a fourteenth lens having negative refractive power, a fifteenth lens having positive refractive power, and a sixteenth lens having negative refractive power.

14. An image capturing module comprising, in order from an object side to an image side, a zoom lens and an image sensor, the zoom lens comprising a first lens group having positive refractive power, a second lens group having negative refractive power, a third lens group having negative refractive power, a fourth lens group having positive refractive power, a fifth lens group having positive refractive power, and a sixth lens group having positive refractive power; wherein the zoom lens satisfies the following conditions:

$$25 < TT/fw < 27; \qquad (1)$$

$$8.5 \text{ mm} < BFL < 12.5 \text{ mm}; \qquad (2) \text{ and}$$

$$(V2+V5)-(V1+V6) > 60, \qquad (3)$$

Wherein, TT is a distance from the object side of the first lens group to the image side of the sixth lens group; fw is a shortest focal length of the zoom lens; BFL is a distance from the image side of the sixth lens group to the imaging sensor; V1 is an Abbe number of the first lens group, V2 is an Abbe number of the second lens group, V5 is an Abbe number of the fifth lens group, V6 is an Abbe number of the sixth lens group.

15. The image capturing module as claimed in claim 14, wherein the first lens group comprises, in order from the object side to the image side, a first lens having negative refractive power, a second lens having positive refractive power, and a third lens having positive refractive power.

16. The image capturing module as claimed in claim 14, wherein the second lens group comprises, in order from the object side to the image side, a fourth lens having negative refractive power, a fifth lens having negative refractive power, and a sixth lens having positive refractive power.

17. The image capturing module as claimed in claim 14, wherein the third lens group comprises, in order from the object side to the image side, a seventh lens having negative refractive power, and an eighth lens having positive refractive power.

18. The image capturing module as claimed in claim 14, wherein the fourth lens group comprises a ninth lens having positive refractive power.

19. The image capturing module as claimed in claim 14, wherein the fifth lens group comprises, in order from the object side to the image side, a tenth lens having positive refractive power, an eleventh lens having negative refractive power, a twelfth lens having negative refractive power, and a thirteenth lens having negative refractive power.

20. The image capturing module as claimed in claim 14, wherein the sixth lens group comprises, in order from the object side to the image side, a fourteenth lens having negative refractive power, a fifteenth lens having positive refractive power, and a sixteenth lens having negative refractive power.

* * * * *